Nov. 22, 1938.         J. F. HALDEMAN         2,137,397
              AERATING DEVICE FOR MINNOW BUCKETS
                       Filed Aug. 7, 1937
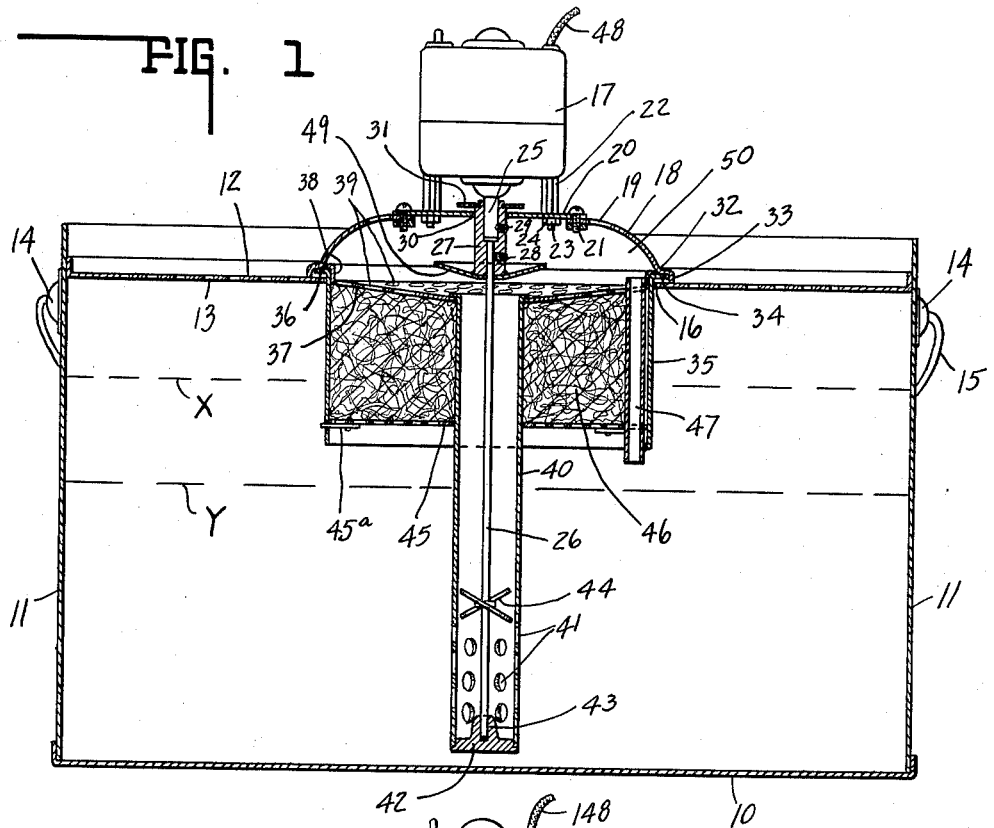
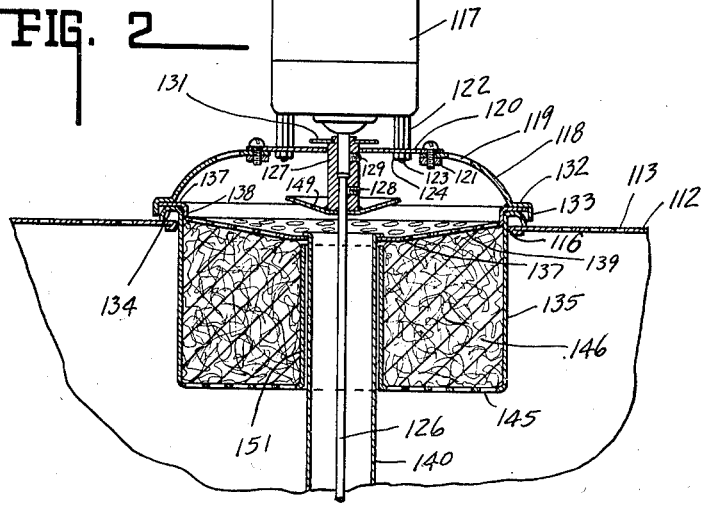
INVENTOR.
JAMES F. HALDEMAN.
BY Lockwood Goldsmith & Galt
                    ATTORNEYS.

Patented Nov. 22, 1938

2,137,397

UNITED STATES PATENT OFFICE 2,137,397

AERATING DEVICE FOR MINNOW BUCKETS

James F. Haldeman, Martinsville, Ind.

Application August 7, 1937, Serial No. 157,890

16 Claims. (Cl. 43—57)

This invention relates to an aerating and filtering device for a fish container such as a minnow bucket.

The chief object of the invention is to clarify and aerate a relatively small supply of water so that minnows and the like may be transported for relatively long distances in said container and maintained therein for relatively long periods of time without undue loss of fish.

The chief feature of the invention consists in providing an aerating and filtering device which may be applied to the usual opening in a standard minnow bucket; which device is motor driven and can be directly connected to the low voltage supply of the automobile in which the bucket is transported. It has been determined, for example, that if a standard minnow bucket equipped with this device be supplied with over two hundred minnows not more than twenty percent loss will occur during a week's confinement therein, whereas at the end of a day without this device almost all the minnows will have died from a lack of oxygen or too dirty water, or both.

Another feature of the invention consists in its interchangeability with the standard minnow bucket cover.

A further feature of the device is that one form of the same can be utilized without the filtering portion thereof being utilized.

Other objects and features of the invention will be readily understood from the accompanying drawing and the following description and claims:

In the drawing Fig. 1 is a central sectional view through a standard minnow bucket on its minor axis, equipped with the invention, the latter, except for the motor, being shown in section.

Fig. 2 is a similar view of a modified form of the invention associated with a portion of a minnow bucket.

In the drawing 10 indicates the bottom, 11 the side walls, 12 the top apertured at 13, 14 the bail mounts and 15 the bail or handle of a conventional minnow bucket. The top has the usual opening 16 therein which normally is closed by a cover or cap.

The filtering and aerating device is a cover replacement unit. It includes a six-volt motor 17 secured in spaced relation to the canopy or cover 18, apertured at 19, by base plate 20 secured at 21 thereto. Tubular members 22, bolts 23 and nuts 24 support the motor in said spaced relation.

Depending from the motor 17 is shaft 25 having an elongated extension 26. Extension 26 is secured to coupling 27 at 28 and the coupling is secured to shaft 25 at 29. The canopy is centrally apertured at 30 to receive the coupling 27. Thereon above the canopy is secured a slinger plate 31 which is engaged by any water working up the shaft or passing through the aperture 30. The plate when rotating with the shaft prevents water working up into motor 17.

The canopy 18 has the offset portion 32 near its lower edge and the top bearing flange 33 at its lower edge. Suitably secured to the offset portion 32 is the flange 34 of the filter chamber member 35. Beneath the offset portion 32 and flange 34 is positioned a flange 36 of the plate 37 which has peripheral portion 38 nested in member 35. Plate 37 is apertured at 39. It also includes a central aperture, and positioned therein and secured to the plate 37 is a tube 40 apertured at 41 near its lower end for intake purposes. The tube is closed by plug 42 including bearing portion 43 for the lower end of shaft 26.

Shaft 26 mounts a screw or impeller 44 of any suitable type which when the shaft is rotated draws water into the tube 40 and forces the same upwardly into the aerating chamber 50 between the canopy 18 and plate 37.

A deflecting baffle 49 of flattened cone form is carried by coupling 27. Water discharged into chamber 50 from tube 40 by the power element 44 engages the baffle 49 and is deflected into engagement with the inner wall of the canopy between apertures 19 and offset portion 32. Air is admitted to chamber 50 by apertures 19. Thus the water supplied to chamber 50 is aerated and returns to the fish container by way of apertures 39 in plate 37.

Another apertured plate 45 is suitably secured at 45a to the lower end of tubular member 35. This connection is of detachable character to permit insertion and removal of filtering means 46 which may be sponges or the like. When the same is employed the aerated water is filtered before returning by gravity to the container supply. The water level may be above the plate 45 as indicated at "X" or below the same but above apertures 41 as indicated at "Y".

To prevent discharge of water from apertures 19, if the filter becomes clogged, an overflow by-pass tube 47 is provided that extends through plates 37 and 45, and is carried by the former.

The motor 17 is supplied with current by the supply lines 48 which may be connected directly to the electrical supply of the vehicle transporting the bucket. If 110 volt supply only is available, a small standard transformer unit would be interposed between supply lines 48 and this high voltage supply.

In Fig. 2 a modified form of the invention is illustrated. Numerals of the one hundred series indicate like or equivalent parts. This form differs from that previously described in that the aerating device is separable from the filtering device so that the former can be used alone or in combination with the filtering device.

In this form plate 137 is supported by the canopy and if the filtering device be not employed the lower edge of portion 133 of the canopy bears upon the container top 112 and plate 137 closes opening 116 therein and partly nests therein. Tubular portion 135 has its flange 134 of rolled character and in this instance serves as a support for the filter device which includes the apertured bottom 145 and central tubular portion 131 which telescopically receives tube 140. The filtering means 146 in this form is supplied from the top as distinguished from the bottom supply shown in Fig. 1.

Of course, when desired, "make-up" water required to replace that lost by evaporation, may be filtered before entering the container by pouring same onto the filtering medium 146.

While the invention has been illustrated and described in great detail in the drawing and specification, respectively, the same is to be considered as illustrative and not restrictive in character.

Various modifications of the inventions, some of which are illustrated, described or suggested herein, as well as others which will readily suggest themselves to persons skilled in this art, are all considered within the broad scope of the invention as defined by the appended claims.

The invention claimed is:—

1. An aerating device for fish containers and the like including in combination, an aerating chamber, a rotatable shaft, a tubular extension depending from the chamber and constituting an intake thereto, an impeller on said shaft in said extension, and a deflecting plate on said shaft and in said chamber, the chamber having aerating openings in its upper portion and apertured at its lower portion for aerated discharge to the container.

2. A device as defined by claim 1, characterized by the addition of a motor secured in spaced relation and superposed relative to said chamber and connected to said shaft, and means preventing creeping of water along the shaft to the motor.

3. A device as defined by claim 1, characterized by the device having its chamber arranged for support by and upon the container and with the extension projecting into the container, and the chamber discharging to the container.

4. A device as defined by claim 1, characterized by the addition of filtering means included within the device for the purpose set forth, and into which said chamber discharges, and overflow discharge means extending from the chamber and bypassing the filtering means upon clogging thereof.

5. An aerating device for fish containers and the like including in combination, an aerating chamber, a rotatable shaft, a tubular extension depending from the chamber and constituting an intake thereto, and an impeller on said shaft in said extension, the chamber having aerating openings in its upper portion and apertured at its lower portion for aerated discharge to the container.

6. A device as defined by claim 5, characterized by the addition of a motor secured in spaced relation and superposed relative to said chamber and connected to said shaft, and means preventing creeping of water along the shaft to the motor.

7. A device as defined by claim 5, characterized by the device having its chamber arranged for support by and upon the container and with the extension projecting into the container, and the chamber discharging to the container.

8. A device as defined by claim 5, characterized by the addition of filtering means included within the device for the purpose set forth, and into which said chamber discharges, and overflow discharge means extending from the chamber and bypassing the filtering means upon clogging thereof.

9. A device as defined by claim 1, characterized by the addition of filtering means included within the device for the purpose set forth, and in depending relation to the aerating chamber and through which the latter discharges to the container.

10. A device as defined by claim 5, characterized by the addition of filtering means included within the device for the purpose set forth, and in depending relation to the aerating chamber and through which the latter discharges to the container.

11. A minnow bucket having an opening in its cover portion, and an aerating device for aeration of the water contained in the bucket by the circulation of such water, said device being supported by the cover portion adjacent the opening and having its water intake portion depending into the bucket through the opening.

12. A minnow bucket having an opening in its cover portion, and an aerating and filtering device supported by the cover portion adjacent the opening, the device having a tubular intake and a filtering portion contiguous thereto and both extending into the bucket opening.

13. A device as defined by claim 12, characterized by the device including an aerating chamber above the cover and by the addition of an overflow arrangement therefrom discharging to the bucket as a bypass when the filtering portion becomes clogged.

14. In combination a motor, a pressure device operable thereby for withdrawing water from the main body thereof in a vessel such as an aquarium and the like, and a relatively closed chamber having free communication with the atmosphere and into which said device discharges under pressure for positive aeration with the air in the chamber, and a discharge from said chamber to the vessel, the positive aeration occurring previous to the discharge.

15. A device as defined by claim 14, characterized by the addition of a filter structure into which the chamber discharges, said filter structure having a discharge to the vessel.

16. A device as defined by claim 14, characterized by the addition of a filter structure into which the chamber discharges, said filter structure having a discharge to the vessel, and a bypass discharge from the chamber for bypassing the filter in the event of filter clogging.

JAMES F. HALDEMAN.